No. 657,340. Patented Sept. 4, 1900.
H. G. DITTBENNER.
STEAM FEED FOR SAWMILLS.
(Application filed Sept. 13, 1898.)
(No Model.) 2 Sheets—Sheet 1.
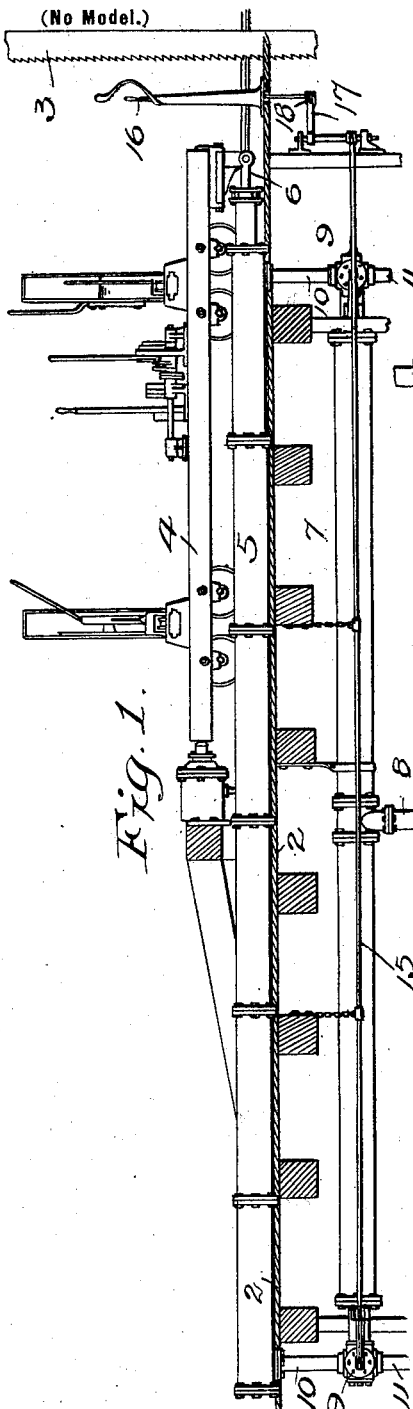
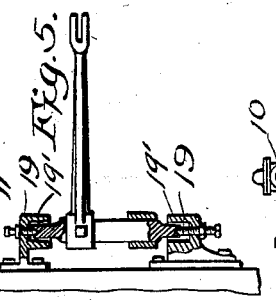
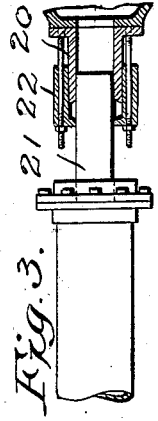
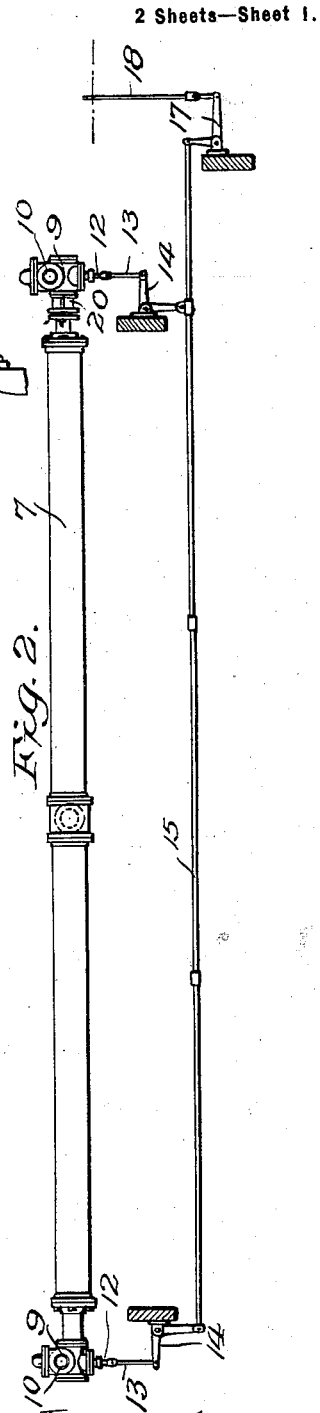
Witnesses:
C. E. Van Doren
M. C. Dooley
Inventor:
Hermann G. Dittbenner,
By Paul O. Hawley
his attorneys.
THE NORRIS PETERS CO., PHOTO-LITHO., WASHINGTON, D. C.

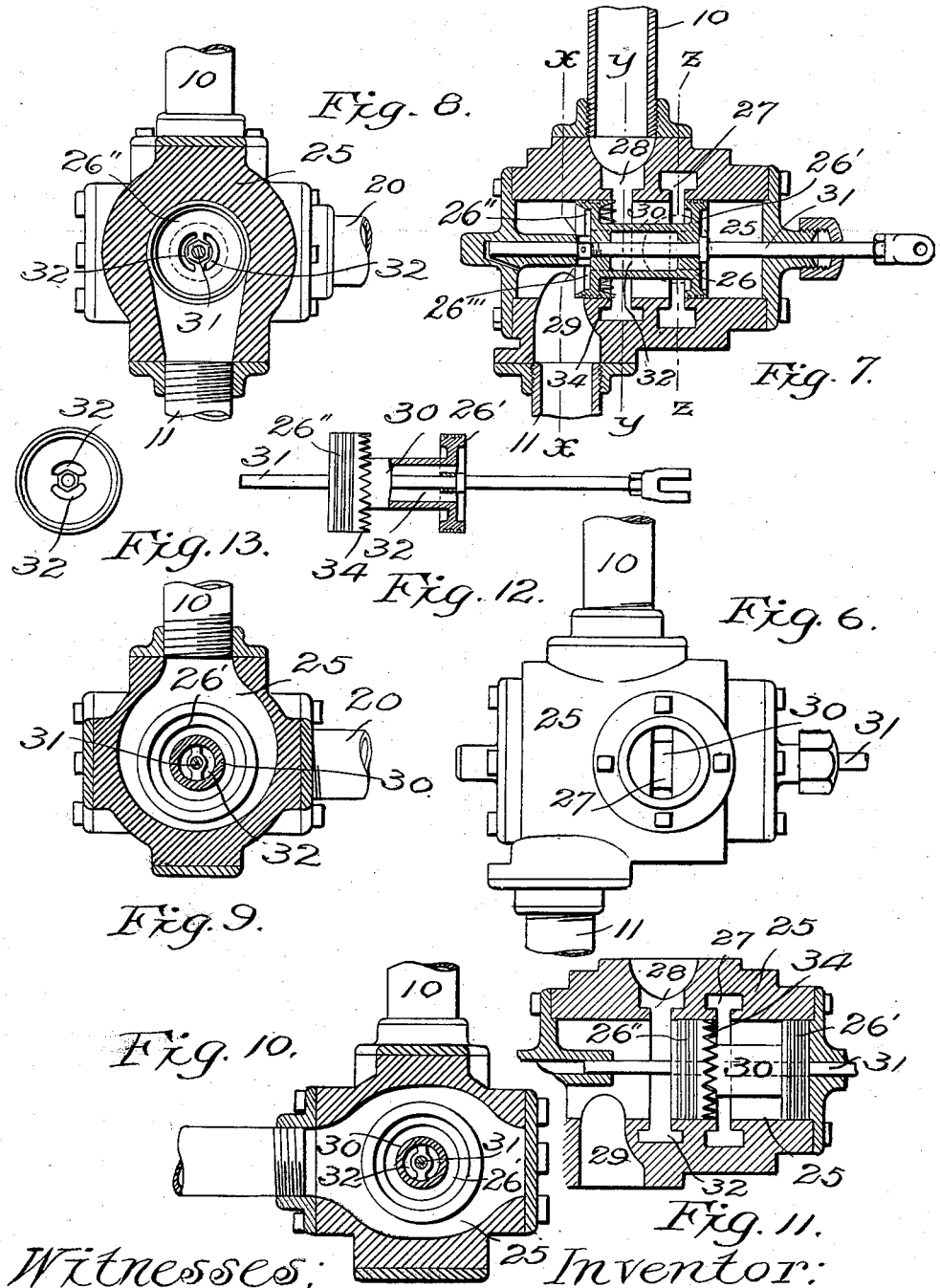

UNITED STATES PATENT OFFICE.

HERMANN G. DITTBENNER, OF MINNEAPOLIS, MINNESOTA.

STEAM-FEED FOR SAWMILLS.

SPECIFICATION forming part of Letters Patent No. 657,340, dated September 4, 1900.

Application filed September 13, 1898. Serial No. 690,838. (No model.)

*To all whom it may concern:*

Be it known that I, HERMANN G. DITTBENNER, of the city of Minneapolis, county of Hennepin, State of Minnesota, have invented certain new and useful Improvements in Steam-Feeds for Sawmills, of which the following is a specification.

This invention relates to means for operating log-carriages in sawmills; and one object is to accomplish the quick starting of the carriage.

Another object of the invention is to decrease the cost of operating the carriage and to provide for more positive, easy, and safe control thereof by the sawyer; and a further object is to save steam and to improve the steam-valves and the operating mechanism.

The invention consists generally in the combination, with the log-carriage and its steam-feed cylinder, of a large steam-reservoir arranged near said cylinder and of substantially the length thereof and having valves at the ends of the cylinder, whereby the entrance and exhaust of steam to said cylinder are controlled, to the end that the steam may be admitted to said cylinder at substantially boiler-pressure, whereby the carriage may be started quickly, after which the steam may be cut off and the expansion of the steam in the cylinder used to drive the carriage to the end of its travel.

The invention also consists in the particular form and construction of the steam-valves and in a reciprocating rod for operating the same, and, further, the invention consists in details of construction and in combinations of parts, all as hereinafter described, and particularly pointed out in the claims.

The invention will be more readily understood by reference to the accompanying drawings, forming part of this specification, and in which—

Figure 1 is a longitudinal elevation of a steam-feed apparatus embodying my invention. Fig. 2 is a plan view showing the position of the steam-reservoir, the valves, and the operating-rod. Fig. 3 is a sectional detail view of the expansion-joints used at the end or ends of the steam-reservoir. Fig. 4 is a detail showing the manner of suspending the valve-operating rod. Fig. 5 is a detail view of the bell-crank that is connected with the operating-lever. Fig. 6 is a side view of the steam-valve. Fig. 7 is a vertical longitudinal section thereof. Fig. 8 is a sectional view on the line $x\,x$ of Fig. 7. Fig. 9 is a sectional view on the line $y\,y$ of Fig. 7. Fig. 10 is a section on the line $z\,z$ of Fig. 7. Fig. 11 is a partial section similar to Fig. 7, showing the exhaust-passage open. Fig. 12 is a separate view of the valve plunger or piston. Fig. 13 is an end view of the valve-piston.

As shown in the drawings, 2 represents the sawmill-floor. 3 represents a section of the band-saw.

4 is the moving log-carriage, which operates upon a suitable track. 5 is the steam-feed cylinder, which is about twice the length of the carriage. 6 is the piston-rod, connected with the piston within the cylinder 5 and coupled to the forward end of the carriage.

7 represents a large pipe, tank, or reservoir, preferably of about the same diameter as the cylinder 5 and nearly as long. The controlling-valves are arranged at the ends of this reservoir to take steam therefrom at substantially boiler-pressure, and pipes 10 lead from the valves to the ends of the cylinder 5. The pipe or reservoir 7 is placed in a convenient position as close as possible to the cylinder 5. I prefer to arrange the same directly beneath the cylinder in order that the connecting-pipes 10 may occupy a vertical position. The steam is conducted to the auxiliary reservoir by a pipe 8, extending from the boiler. The reservoir connections are preferably coupled to the sides of the valve 9, and the exhaust steam-pipes 11 preferably lead from the under sides thereof. Piston-valves are preferably employed, and the valve-rods 12 thereof are connected by links 13 and bell-cranks 14 to a long rod 15, that is preferably suspended beneath the floor, as shown. This rod 15 is connected to the sawyer's operating-lever 16 by suitable means, whereby the rod may be longitudinally moved or reciprocated to open and close the piston-valves. As the sawyer's lever ordinarily operates in a plane transverse to the line of movement of the carriage, I prefer to connect said lever with the rod 15 by means of a bell-crank 17 and rod or link 18. The bell-cranks 14 and 17 are arranged in fixed bearings upon the upright timbers of the mill and do not move with the valves, which latter change their positions, owing to the expansion and contraction of the steam-feed cylinder 5. This movement of the valves, however, does not materially alter the relations of the plungers or pistons thereof to the operating-rod 15, owing to the employment of the long links 13 between the ends of the valve-rods and the bell-cranks 14. In this manner I am able to avoid one of the chief objections to the rocking shaft that is usually employed in place of the operating-rod 15 shown herein. In order that the rod 15 may be moved with the greatest possible ease, I prefer to construct the bell-cranks as shown in Fig. 5, providing each with a long center shaft that is held by the cone or pin bearings 19. If a pin or screw 19 breaks, the shaft will still be held by the collars or caps 19' to prevent a complete break down and possible accident. As the cylinder 5 and the reservoir 7 do not expand and contract together, I prefer to connect the valves 9 rigidly to the ends of the cylinder 5 by means of said pipes 10 and provide expansion or sliding joints between the valves and the ends of the reservoir 7. Only one such joint is absolutely required. These expansion-joints may be of any suitable construction; but I prefer to employ the telescoping sleeves or pipes 20 21 and the adjustable packing-gland 22, as shown in Fig. 3.

To insure the safety of the men who ride upon the log-carriage and to obtain the rapid operation of the carriage, it is necessary that the steam-feed valves should operate smoothly and easily, so that the same may be readily controlled by the sawyer.

The valve as I construct the same comprises the cylinder 25 and the piston 26 therein. The cylinder is provided with two ports 27 28, the first being connected with the reservoir 7 by the pipe 20 and the port 28 being the cylinder port and connected with the cylinder 5 by the pipe 10. The valve-cylinder is also provided with the exhaust-opening 29, communicating with the exhaust-pipe 11. The ports 27 28 are preferably annular, extending around the full circumference of the cylinder. The piston 26 is provided with a reduced middle portion 30, whereby an annular space is provided between the two ends 26' and 26" of the piston. This space is long enough to bridge the ports 27 28, whereby the steam is admitted from the port 27 to the port 28 and the cylinder-pipe 10. The piston is carried upon the valve rod or stem 31, which has bearings in the ends of the cylinder 25 and whereon the valve-piston 26 is held between the collar and a fixed nut upon said rod or stem 31. To prevent the formation of a cushion between the end 26' of the piston and the end of the valve-cylinder, said piston is provided with a central duct 32, that leads from end to end thereof, whereby any steam that may leak past the part 26' into the cavity back thereof may escape into the exhaust-cavity at the opposite end of the valve-cylinder.

One of the chief objections to most steam-feed valves is that the pistons stick in their cylinders as the same are moved to open their main ports. This is due to the sudden rush of steam to the side of the valve toward the pipe leading to the steam-feed cylinder. In order to avoid this difficulty, I provide the tight-fitting piston end 26" with an overhanging annular flange 34, which flange is serrated or perforated to compel an equal distribution of steam at all points about the cylinder port or groove, whereby the piston is held in balance in all directions in the valve-cylinder. After the pressure is established in the cylinder-pipe 10 the tendency to unbalance the piston is removed and it may be readily removed to the position where the cylinder-port will be fully opened.

An advantage which my valve has over others follows from the position of the exhaust-port of the valve at one end of the valve-cylinder, so that when the valve-piston is drawn out to close the live-steam passage and open the cylinder-port for the exhaust of steam the exhaust-steam will pass directly over the end of the valve-piston and down into the exhaust cavity or port of the valve. A quick exhaust is thus obtained, and, furthermore, all water of condensation will freely drain from the cylinder-port into the exhaust-port beneath.

To prevent the drawing back of the piston by the exhaust passing the end thereof, I provide the piston with a conical recess 26''' in its end, which causes sufficient back pressure thereon to counteract the draft upon the same.

By supplying steam to the cylinder at practically boiler-pressure much loss is avoided, and as the carriage may be started with a small amount of steam, the expansion of the high-pressure steam will serve to move the carriage the greater part of the stroke or travel.

Having thus described my invention, I claim as new and desire to secure by Letters Patent—

1. The combination, with a sawmill-carriage and its steam-feed cylinder and piston, of a steam-reservoir arranged in close proximity to said cylinder, pipes leading from said reservoir to the opposite ends of said cylinder, valves in said pipes and means for operating said valves, substantially as described.

2. The combination, with a sawmill-carriage and its steam-feed cylinder and piston, of a steam-reservoir wherein a high pressure of steam may be maintained, said reservoir being of substantially the same length as said cylinder and located in proximity thereto, short pipes leading from the ends of said reservoir to said cylinder, valves arranged in said pipes and means for operating said valves, substantially as described.

3. The combination, with a sawmill-carriage and its steam-feed cylinder and piston, of a steam-reservoir wherein a high pressure may be maintained, said reservoir being arranged in close proximity to said steam-feed cylinder and parallel therewith, short pipes or ducts connecting the ends of said cylinder and said reservoir, longitudinally and circumferentially balanced, valves provided in said pipes, and a longitudinally-movable rod for operating said valves, substantially as described.

4. The combination, with the steam-feed cylinder of a steam-reservoir arranged in proximity to said cylinder and parallel therewith, short pipes or ducts connecting said reservoir with said cylinder, valves arranged in said pipes or ducts, bell-cranks having fixed bearings or pivots and connected with said valves by suitable link-rods, and a longitudinally-movable rod connecting said bell-cranks for operating said valves, substantially as described.

In testimony whereof I have hereunto set my hand, this 8th day of September, 1898, at Minneapolis, Minnesota.

HERMANN G. DITTBENNER.

In presence of—
M. E. GOOLEY,
RICHARD PAUL.